(12) United States Patent
Franco

(10) Patent No.: US 11,750,596 B2
(45) Date of Patent: *Sep. 5, 2023

(54) USING EPHEMERAL URL PASSWORDS TO DETER HIGH-VOLUME ATTACKS

(71) Applicant: PayPal, Inc., San Jose, CA (US)

(72) Inventor: John Franco, Seattle, WA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,013

(22) Filed: Feb. 28, 2022

(65) Prior Publication Data

US 2022/0394025 A1    Dec. 8, 2022

Related U.S. Application Data

(63) Continuation of application No. 16/124,728, filed on Sep. 7, 2018, now Pat. No. 11,310,217.

(51) Int. Cl.
*H04L 9/40* (2022.01)
*H04L 9/32* (2006.01)

(52) U.S. Cl.
CPC .......... *H04L 63/083* (2013.01); *H04L 9/3242* (2013.01); *H04L 63/1441* (2013.01)

(58) Field of Classification Search
CPC .. H04L 63/083; H04L 9/3242; H04L 63/1441
See application file for complete search history.

(56) References Cited

U.S. PATENT DOCUMENTS

| | | | |
|---|---|---|---|
| 8,635,373 B1 * | 1/2014 | Supramaniam | H04L 67/01 709/248 |
| 10,262,129 B1 * | 4/2019 | Gupta | H04L 63/0823 |
| 11,093,207 B1 * | 8/2021 | Lovelock | G06F 3/147 |
| 2006/0230268 A1 | 10/2006 | Muller et al. | |
| 2007/0234062 A1 | 10/2007 | Friedline | |
| 2010/0083361 A1 | 4/2010 | Fleming et al. | |
| 2011/0107093 A1 | 5/2011 | Muller et al. | |
| 2013/0191884 A1 | 7/2013 | Leicher et al. | |
| 2013/0198516 A1 * | 8/2013 | Fenton | H04L 63/06 713/168 |

(Continued)

FOREIGN PATENT DOCUMENTS

| | | |
|---|---|---|
| CN | 104519049 | 4/2015 |
| CN | 106470190 | 3/2017 |

(Continued)

OTHER PUBLICATIONS

Extended European Search Report for Application No. 19856568.1 dated Sep. 23, 2021, 12 pages.

(Continued)

*Primary Examiner* — Trang T Doan
*Assistant Examiner* — Vladimir I Gavrilenko
(74) *Attorney, Agent, or Firm* — Haynes and Boone, LLP

(57) ABSTRACT

Methods and systems for using ephemeral URL passwords to deter high volume attacks is described. A request to access one of several protected URLs is detected from a client computing device. A URL password is received from the client computing device. The request is redirected to the protected URL upon determining that the received URL password is valid for the one of the several of protected URLs.

20 Claims, 5 Drawing Sheets

(56) References Cited

U.S. PATENT DOCUMENTS

| 2015/0052584 | A1* | 2/2015 | Rudraraju | H04L 63/102 |
| | | | | 726/4 |
| 2016/0164861 | A1 | 6/2016 | Treleaven et al. | |
| 2018/0288063 | A1* | 10/2018 | Koottayi | G06F 21/50 |
| 2020/0052913 | A1* | 2/2020 | Orshansky | H04L 9/3278 |

FOREIGN PATENT DOCUMENTS

| CN | 107070863 | 8/2017 |
| CN | 107077574 | 8/2017 |
| WO | 2008024362 A2 | 2/2008 |

OTHER PUBLICATIONS

International Appl. No. PCT/US2019/049813, International Preliminary Report on Patentability dated Mar. 18, 2021, 9 pages.
International Appl. No. PCT/US2019/49813, International Search Report and Written Opinion dated Nov. 29, 2019, 15 pages.

* cited by examiner

USING EPHEMERAL URL PASSWORDS TO DETER HIGH-VOLUME ATTACKS

CROSS REFERENCE TO RELATED APPLICATIONS

The present application is a continuation application of U.S. patent application Ser. No. 16/124,728, filed Sep. 7, 2018, and is incorporated in reference in its entirety.

TECHNICAL FIELD

The subject technology generally relates to deter bad actors and more particularly, relates to a system and method that utilizes ephemeral uniform resource locator (URL) passwords to prevent high-volume attacks.

BACKGROUND

Financial institutions such as Xoom© expose URLs to the internet that are utilized by external merchant and customer clients for authentication purposes. These URLs pose a security risk because the URLs must accept unauthenticated requests as part of the authentication process while at the same time provide a path into a customers' accounts and finances. Consequently, these URLs have become targets of high-volume credential-stuffing and denial-of-service attacks by bot nets.

In the instance of credential-stuffing, hackers may acquire stolen account credentials and attempt to use them to access user accounts through large-scale automated login requests directed against web applications. In other words, a large number of compromised account credentials (e.g., username and password pairs) may be tried across different URLs associated with different organizations. The likelihood that any individual stolen credential is the actual username and password for an account of a particular organization is low; however, by trying a large collection of stolen credentials across accounts of many different organizations, potential username and password matches may be discovered. These types of techniques are facilitated by modern computing power, where numerous usernames and passwords can be tried in a short amount of time.

While certain organizations now require more robust passwords, or utilize programs such as captcha, bad actors continue to develop workarounds that neutralize many of these requirements. Furthermore, more robust passwords are no longer useful when bad actors are able to obtain stolen credentials. Thus, in order to stymie such hacking attempts, new methods for slowing down such high-volume attacks without locking out legitimate users may be adopted.

SUMMARY

According to various aspects of the subject technology, a system for using ephemeral URL passwords to deter high volume attacks is described. A request to access one of several protected URLs is detected from a client computing device. A URL password is received from the client computing device. The client computing device's request is redirected to the protected URL upon determining that the received URL password is valid for that URL.

According to various aspects of the subject technology, a method using ephemeral URL passwords to deter high volume attacks is described. A request to access one of a plurality of protected URLs is detected from a client computing device. A URL password is received based on a codebook downloaded by the client computing device. A determination is made that the codebook on which the received URL password is based isn't expired. Another determination is made that the received URL password is not found in a cache of previously used URL passwords. A further determination is made that the received URL password is valid for the URL requested by the client device. The client computing device's request is then redirected to the protected URL.

According to various aspects of the subject technology, a non-transitory machine-readable medium having stored thereon machine-readable instructions executable for using ephemeral URL passwords to deter high volume attacks is described. A request to access one of several protected URLs is detected from a client computing device. A URL password is received from the client computing device. The request to access is redirected to the protected URL upon determining that the received URL password is valid for the protected URL.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
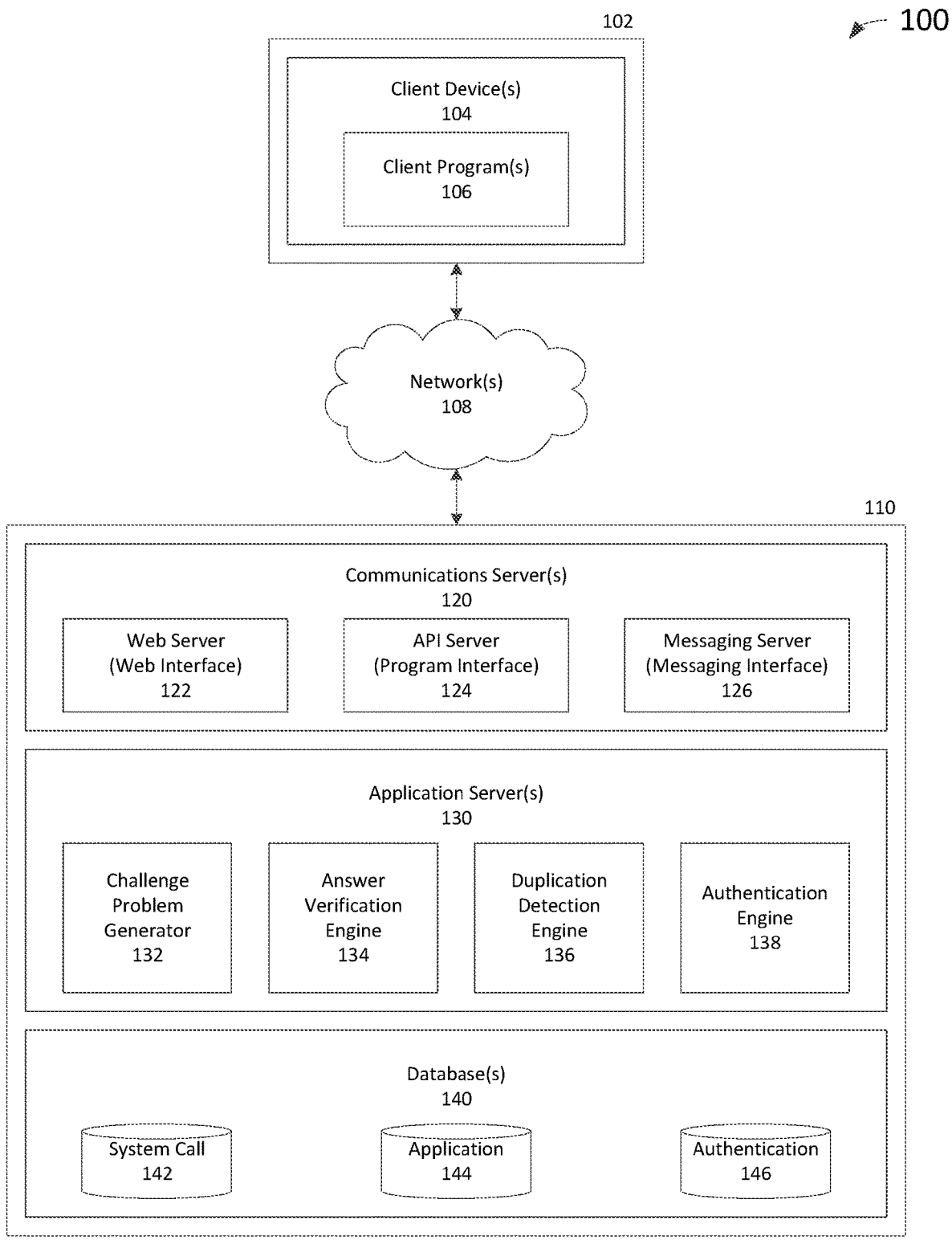
FIG. 1 is a block diagram of an exemplary computing system on which a determination of the legitimacy of clients using ephemeral URL passwords may be performed.

Personal electronic devices (e.g., smartphones, desktops, tablets, laptops, etc.) are used for a variety of purposes including but not limited to real-time communications, financial transactions, and the transmission of or sharing of data. For these activities to be properly conducted, a user must be authenticated to ensure that the user is who the user claims to be. Numerous applications are provided for users to connect to their accounts which contain sensitive information (e.g., personal information, financial information, etc.). As a result, these applications that serve as gateways to sensitive information become targets for unscrupulous activity.

One technique that is popular among hackers is credential stuffing, where hackers run programs (e.g., bot nets) that attempt large-scale login requests directed against web applications using stolen or even made-up credentials (e.g., username and password pairs). Bot nets may simulate authentication requests on URLs of certain merchants. Advancements in computing power has only made it easier for hackers to try larger collections of credentials over a shorter period of time. While tools such as reCaptcha have been used to prevent mass authentication requests, the use of tools like reCaptcha may cause friction in the login process and in turn may turn customers away. Ultimately, through sheer brute force method, certain accounts may be compromised.

One way to inhibit high-volume attacks by bot nets that send high rates of customer authentication requests is to require a client to pay a computational cost before each authentication request may be submitted. Doing so would cause the systems used by potential hackers to have to spend more resources to attempt a volume attack. Such a mechanism may discourage hackers from launching these attacks because they are no longer efficient or effective, or it may cause the hackers to switch to a different target that does not carry such a cost. A legitimate client, however, won't be discouraged to pay the computational cost since the legitimate client owns the credential for successfully performing the authentication request. Bot nets, on the other hand, are required to pay the computational price each time an attempt is made. In other words, a legitimate client would only have to pay the cost once per login attempt (assuming the attempt is successful), whereas a bot net will pay the cost for each of the many attempts (an extremely high percentage which are unsuccessful).

The success of this approach relies on several characteristics of the challenge protocol: 1) that there are multiple correct answers to a single challenge; 2) that answers to the challenge provided by the clients are easily verifiable; 3) that each of the correct answers to the challenge can only be used once; and 4) that any single challenge is usable for only a limited amount of time. These characteristics are realized by requiring external clients to perform a computationally expensive task (e.g., finding a 256-bit value that, when used as the key in an HMAC-SHA-256 calculation on a server-provided nonce, produces a signature having a prefix that the server has associated with the URL) to authorize a request to a protected URL, where the key and the nonce together constitute a valid "password" for the URL. The computationally expensive tasks may be provided in a codebook that's downloadable by the client, where the codebook defines certain characteristics of the challenge protocols including their lifespans (i.e., how long each of the challenge protocols may be used for).

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

FIG. 1 is a block diagram of an exemplary computing system on which a determination of the legitimacy of clients using ephemeral URL passwords may be performed. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may also include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MIMS, telephone, VoIP, video messaging, IRC, and so forth, and messaging server 126 may provide a messaging interface to enable access by client 102 to the various services and functions provided by application servers 130.

Application servers 130 of network-based system 110 may be servers that provide various services to client devices, such as tools for authenticating users and associated libraries. Application servers 130 may include multiple servers and/or components. For example, application servers 130 may include a challenge problem generator 132, answer verification engine 134, duplication detection engine 136, and/or authentication engine 138. These servers and/or components, which may be in addition to other servers, may be structured and arranged to identify those webpages that malicious content.

Application servers 130, in turn, may be coupled to and capable of accessing one or more databases 140 including system call database 142, application database 144, and/or authentication database 146. Databases 140 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
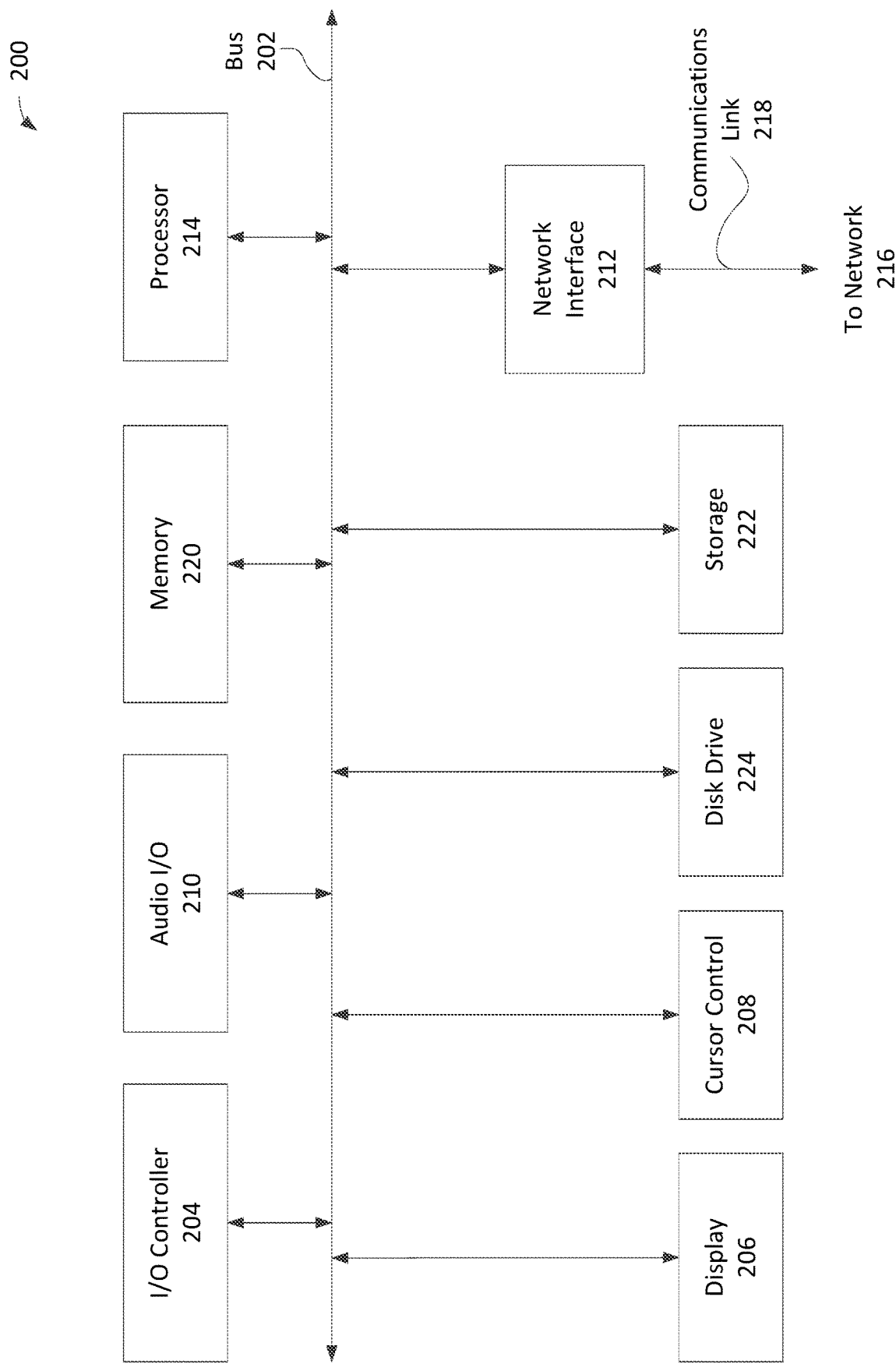
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

One strategy that may be employed to defend a service against a flood of requests from a bot net is to insert obstacles that cost clients exponentially more computing power to surmount than for the server to impose the obstacles. At the same time, these obstacles must be kept small enough in absolute terms so that legitimate clients that typically don't send rapid-fire requests can negotiate the obstacles without a significant degradation in a user's experience.

In an exemplary embodiment, the obstacle can be implemented in a proxy without the services behind the proxy needing to be aware of it or having to accommodate it in any way. An HTTP server may act as a proxy that redirects requests to other services based on components of a URL's path. An example obstacle is the use of ephemeral URL passwords. The passwords in this example are a large set of solutions to a cryptographic problem that requires a brute force computationally expensive solution. Each problem instance may be bound to a specific URL (or set of URLs). While the ensuing discussion uses ephemeral URL passwords as the obstacle, various other computationally expensive challenges having the same or similar characteristics may be utilized.

Figure 3:
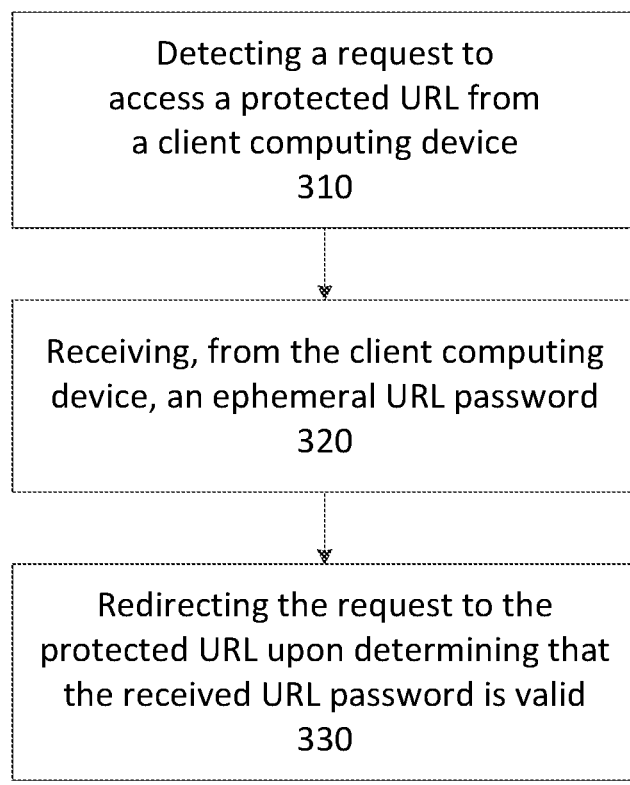
FIG. 3 illustrates an exemplary process 300 for using ephemeral URL passwords to determine the legitimacy of clients.

FIG. 3 illustrates an exemplary process 300 for using ephemeral URL passwords to determine the legitimacy of clients. At operation 310 the system detects a request to access a protected URL. An access request may be detected as a user navigating to the protected URL on a browser. In an example, a set of protected URLs may be called by public clients for the purpose of authenticating a user. Since users may not be initially authenticated, the URLs can't simply restrict access to authenticated users only. At the same time, these URLs offer a path into a user's account and finances, thus they have become high-value targets for attack that require some elements of protection.

The set of URLs may be protected, in this instance, by using ephemeral URL passwords. In some embodiments, the set of protected URLs require an ephemeral URL password when a client navigates to the any of the URLs. Accordingly, at operation 320, the system receives, from the client, the ephemeral URL password. In order for the client to provide the password, the client must first download a codebook that specifies challenges for the protected URLs. Each protected URL will have a unique challenge that the client must fulfill to proceed with accessing the protected URL. After receiving the password from the client, the system may, at operation 330, redirect the client computing device's request to the protected URL, upon determining that the received ephemeral URL password is valid. If the password is invalid, access to the protected URL is denied until the client provides a valid password.

As discussed above, in an exemplary embodiment, the challenge is an ephemeral URL password challenge. More specifically, the challenge is a hash-based message authentication code (HMAC) operation that uses SHA-256 as its hash function (i.e., an HMAC-256). The HMAC-256 operation takes two parameters, a key and a first byte array to sign with the key, and produces a second byte array, which is the signature. This design uses fixed values (i.e., nonces) for the byte array to sign, and forces the client to find a key that, when used to sign the nonce with HMAC-256, produces a signature having a desired prefix.

The nonce being used in this case is a server-generated string that clients must feed into their HMAC-256 calculations while searching for a key that yields a desired bit string prefix. The client sends the resulting key along with the nonce as the URL password in its request to the server. The nonce is a part of a codebook, which will be described in more details below, and serves as a globally-unique identifier of the codebook.

The property of the HMAC-256 operation most important for this design is its irreversibility. That is, in order to produce a result having a certain prefix, a client has to search through possible parameters to the operation until it finds parameters that produce such a result. Another aspect of irreversibility is that, for a given nonce, any prefix of practical length can be generated by a very large number of distinct keys. This allows the server to control the nonce without risk of rendering any prefixes impossible to generate. Furthermore, because HMAC-256 keys are 256 bits long, any prefix of length n has, on average, $2^{256-n}$ distinct keys that produce it for a given nonce.

HMAC has generally been used to securely transfer files between a server and a client. More specifically, HMAC is used to verify both the data integrity and the authentication of the message being exchanged. Accordingly, using HMAC-256 for the purpose of requiring external clients to perform a computationally expensive task before authorizing a request to a protected URL, as described herein, is an unconventional adaptation of the hash-based authentication code. That is, HMAC-256 isn't being used to verify the integrity or authentication of a message, but to simply impose a cost on a client in the form of requiring the client of find a specific 256-bit value that, when used as the key in an HMAC-256 calculation on a server-provided nonce, produces a signature having a prefix that the server has associated with the URL. In other words, the system requires that the client obtain a password by performing the computationally intensive operation. Any client that's willing to perform the operation can obtain a valid password.

The URL password is an HMAC-256 key, nonce pair that allows a client to call a protected URL. The key is a solution to the problem of finding an HMAC-256 key that, when used to compute the HMAC-256 of the nonce, produces a signature having a bit string prefix associated with the URL by the codebook identified by the nonce. The bit string prefix is a sequence of bits mapped to a URL (or a set of URLs) in a codebook, and thus, is the target of the search through HMAC-256 keys that a client must perform to call the URL. The search succeeds when the binary representation of the signature produced by the HMAC-256 algorithm begins with a sequence of 0 and 1 digits matching the prefix.

The client must pay the cost for every attempted call of the URL, but cannot use the password more than once. This characteristic is particularly useful in the case of a URL that's used for authenticating users. Specifically, legitimate clients avoid paying the cost more than once because their first authentication attempt is usually successful. Bad actors, on the other hand, that try a list of compromised credentials may be disincentivized to continue because of the high login failure rates, where each failure would require that the client perform the computationally intensive operation again.

The URL password is ephemeral in two ways: first, each password is restricted to a single use, so sending additional requests with the same password will fail. Restricting each valid password to a single use forces clients to pay the performance cost anew for each repeated call to a single URL. Clients that know they'll need to call multiple service URLs can collect HMAC-256 keys valid for each during the course of a single search, reducing the search cost per URL by a small factor. The number of valid passwords available for use is larger for shorter prefixes.

Secondly, the codebook itself is ephemeral so that the nonce won't be usable with any key for more than a predetermined/limited amount of time. Longer codebook lifetimes raise the probability of legitimate clients colliding with each other (i.e., legitimate clients providing the same valid password). Longer codebook lifetimes also produce a larger amount of used passwords that the server must track to enforce single-use. Shorter codebook lifetimes, on the other hand, raise the frequency with which clients must retrieve new codebooks. Legitimate clients can further reduce the likelihood of collisions with each other by using a cryptographically strong pseudo-random number generator, seeded from a source of high entropy, to generate the initial key for a search, and then generating each subsequent key by computing the SHA-256 hash of the current key.

As mentioned above, the client attempts to find a valid HMAC-256 key by searching through a large number of keys. The length of the mapped bit string prefixes provides the exponential cost differential between client and server. For prefix length n, a client would need to perform an average of $2^n$ key generations and HMAC-256 operations to find a key that produces a desired prefix for a given nonce. In contrast, the server needs to perform only a single HMAC-256 operation on the nonce with the client-generated key to obtain the prefix to find in its map. A compromise between the performance of good-faith calls to a URL and inhibiting abuse of the URL may be struck by varying the prefix length and by associating multiple prefixes in a map with the same URL. Furthermore, this type of challenge may easily be adapted to increased computational power increases by changing the prefix length.

While the mapped prefixes don't necessarily all have to have the same length, they must all be disjointed. That is, no prefix in the map can be a prefix of any other prefix in the map. Using different prefix lengths in the same map could serve, for example, to raise the client's cost of calling more sensitive or resource-intensive URLs over that of calling less-sensitive or lighter-weight URLs. A more precise way to vary protection for URLs in a map is to map multiple prefixes to the same URL: for a map in which all prefixes are the same length n, mapping a shorter prefix of length n–p to URL u is equivalent to having $2^p$ entries mapping prefixes of length n to u, but there's no shorter-prefix equivalent to adding a number m of entries to a map where m is not a power of two. Allowing for the association of a single URL with m prefixes of length n in a single map, the average search time for the URL becomes $2^n/m$.

The system requires and validates URL passwords on URLs it protects. The system can also serve as a proxy if it serves URLs by redirecting valid requests to other servers relying on it for protection. For example, when the protected URLs in a codebook refer to servers in a data center different than the server that protects the URL, and to which the system redirects valid requests, the system may act as an enforcing proxy.

Figure 4:
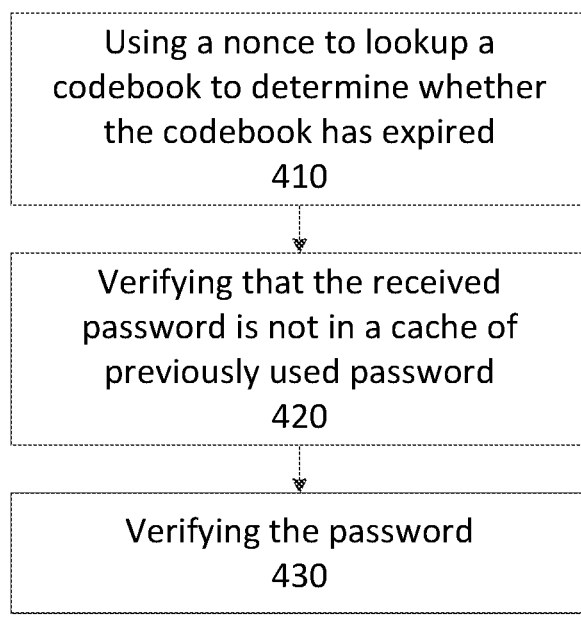
FIG. 4 illustrates an exemplary process 400 for validating the URL password.

FIG. 4 illustrates an exemplary process 400 for validating the URL password. This validation process is multi-faceted. In operation 410, the nonce is used to look up the corresponding codebook to ensure that the codebook hasn't expired. Once the codebook is determined to not have expired, the system then verifies that the password is not in a cache of previously used passwords (e.g., a Redis cache) in operation 420. In other words, if the password was previously used, the system will not accept the password even though it may be a correct answer to the challenge. As discussed above, one ephemeral feature of the URL password is that each password is restricted to a single use. Any repeat submission of a password will be identified from the cache of previously-used passwords and access will be denied. If the password is determined to have not been previously used, the password is verified in operation 430.

In some embodiments, the nonce is used to find its corresponding codebook in the cache. The HMAC-256 signature of the nonce is subsequently calculated using the HMAC-256 key. To verify the key, the system looks for a prefix in the codebook matching the signature, and retrieves the associated method reference. A verification that the HTTP method of the client's request matches that of the method reference is then performed. A verification that the path of the client's request matches that of the method reference is also performed.

Once the password has been verified and recorded to prevent future re-use, the proxy resolves the mapped URL to an appropriate internal endpoint and redirects the request there. In other words, once the proxy has verified that the cost of the challenge has been paid, it redirects the request to an endpoint corresponding to the mapped URL. That endpoint is free to enforce any additional restrictions on the requests it receives.

Figure 5:
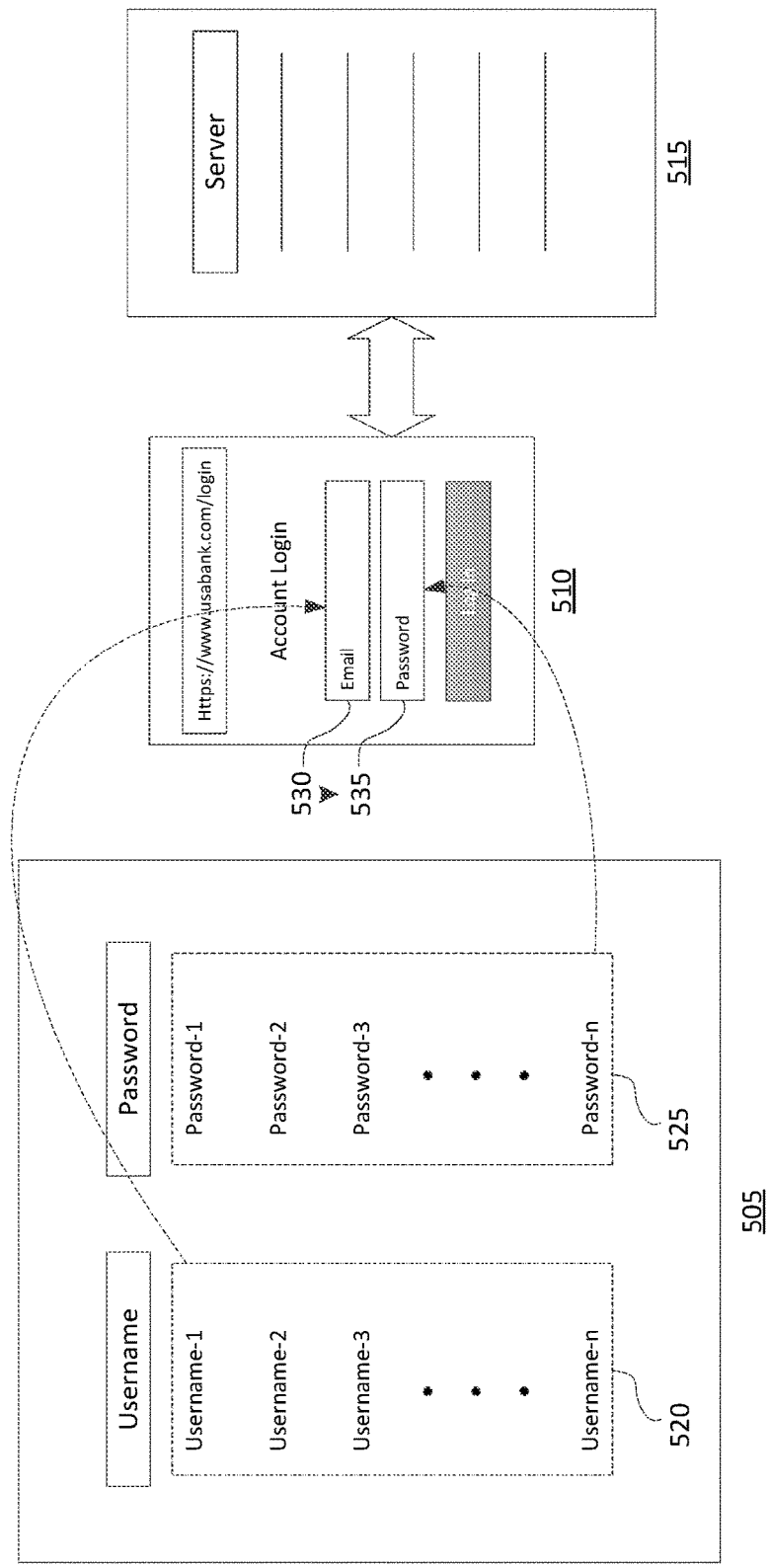
FIG. 5 provides an illustrative depiction of a credential stuffing attempt on a computing device within a network of computing devices.

FIG. 5 provides an illustrative depiction of a credential stuffing attempt on a computing device within a network of computing devices. A list of compromised credentials 505 is used to attempt logins on a web browser 510 running on a client computing device. The web browser is communicatively coupled to a server 515 via a network connecting the computing device to the server 515.

In this example, the username 520 and password 525 pairs are individually tried in the username entry box 530 and password entry box 535 on the web browser 510. When the server 515 detects that the web browser 510 of the client computing device attempts to navigate to a protected URL, the server looks for and validates a response provided by the client in response to a challenge matching the protected URL. Only when a valid response is present will the server redirect the client's request to the protected URL. Thus, for each username 520 and password 525 pair that is tried, there's an associated computational cost to the attempted login because of the client computing device must fulfill the challenge-response problem. As the number of username 520 and password 525 pairs grows, so does the cumulative cost of the challenge-response. For example, if there are 100,000 username 520 and password 525 pairs, the cost to the computing device to try every pair would be 100,000 multiplied by the computational cost required by the challenge-response problem.

Since hackers using techniques like credential stuffing rely on the ability to try large numbers of credentials in a short period of time, slowing down the process of navigating to a protected URL to enter credentials by requiring a challenge-response answer will create a bottleneck in the hacking process that may lead the hackers to ultimately abandon their attempts. If, hypothetically speaking, one out of 10,000 credentials tried is successful, then an average of 10,000 login attempts would be needed to infiltrate one account. Thus, by challenging the process in a manner where trying a large amount of credentials on a web browser would take an inordinate amount of time, hackers will be discouraged from trying to compromise an account of a protected URL.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system, comprising:
   a processor;
   a network interface device; and
   a non-transitory computer-readable medium having stored thereon instructions executable to cause the system to perform operations comprising:
   detecting a first request to access a protected uniform resource locator (URL) from a client computing device;
   without first providing the client computing device access to specific content of the protected URL, issuing a time-limited challenge request for a URL password to the client computing device, wherein the time-limited challenge request includes a nonce comprising a specific string;
   receiving, from the client computing device and in response to the time-limited challenge request, the URL password, wherein the URL password includes a key value computed by the client computing device using a cryptographic signature algorithm, and wherein a correct key value for the URL password, when used to sign the nonce using the cryptographic signature algorithm, results in a cryptographic signature value that includes a minimum specified length bit string matching a required bit string for the time-limited challenge request;
   performing a verification operation to determine whether the key value included in the URL password, when used to sign the nonce using the cryptographic signature algorithm, results in a cryptographic signature value that includes the required bit string; and
   responsive to a success of the verification operation, providing the client computing device access to the specific content of the protected URL.

2. The system of claim 1, wherein the operations further comprise:
   providing a codebook to the client computing device, wherein the codebook comprises information specifying details of the cryptographic signature algorithm.

3. The system of claim 2, wherein the codebook further comprises a plurality of cryptographic signature algorithm specifications, including a specification for the cryptographic signature algorithm, and wherein each of the cryptographic signature algorithm specifications has a corresponding time limit on how long that cryptographic signature algorithm is valid.

4. The system of claim 1, wherein the operations further comprise:
   responsive to a failure of the verification operation, denying the client computing device access to the specific content of the protected URL.

5. The system of claim 1, wherein performing the verification operation further comprises checking that the key value has not been previously used.

6. The system of claim 1, wherein the operations further comprise:
   recording the key value in a used passwords database, wherein key values in the used passwords database are not eligible to be re-used to access the protected URL.

7. The system of claim 1, wherein the cryptographic signature algorithm comprises a 256 bit hash value operation.

8. A method, comprising:
   detecting, at a computer system, a first request to access a protected uniform resource locator (URL) from a client computing device;
   without first providing the client computing device access to specific content of the protected URL, the computer system issuing a time-limited challenge request for a URL password to the client computing device, wherein the time-limited challenge request includes a nonce comprising a specific string;
   receiving, at the computer system from the client computing device and in response to the time-limited challenge request, the URL password, wherein the URL password includes a key value computed by the client computing device using a cryptographic signature algorithm, and wherein a correct key value for the URL password, when used to sign the nonce using the cryptographic signature algorithm, results in a cryptographic signature value that includes a minimum specified length bit string matching a required bit string for the time-limited challenge request;
   performing a verification operation to determine whether the key value included in the URL password, when used to sign the nonce using the cryptographic signature algorithm, results in a cryptographic signature value that includes the required bit string; and
   responsive to a success of the verification operation, providing the client computing device access to the specific content of the protected URL.

9. The method of claim 8, wherein the specific content of the protected URL includes a user login and user password submission form corresponding to an electronically provided service.

10. The method of claim 9, wherein the electronically provided service comprises an electronic financial transaction service.

11. The method of claim 8, wherein providing the client computing device access to the specific content of the protected URL comprises re-directing the client computing device to the protected URL in response to the first request.

12. The method of claim 8, wherein performing the verification operation further comprises checking that the key value has not been previously used.

13. The method of claim 8, further comprising:
recording the key value in a used passwords database, wherein key values in the used passwords database are not eligible to be re-used to access the protected URL.

14. A non-transitory computer-readable medium having stored thereon instructions that are executable by a second electronic device to cause the second electronic device to perform operations comprising:
detecting a first request to access a protected uniform resource locator (URL) from a client computing device;
without first providing the client computing device access to specific content of the protected URL, issuing a time-limited challenge request for a URL password to the client computing device, wherein the time-limited challenge request includes a nonce comprising a specific string;
receiving, from the client computing device and in response to the time- limited challenge request, the URL password, wherein the URL password includes a key value computed by the client computing device using a cryptographic signature algorithm, and wherein a correct key value for the URL password, when used to sign the nonce using the cryptographic signature algorithm, results in a cryptographic signature value that includes a minimum specified length bit string matching a required bit string for the time-limited challenge request;
performing a verification operation to determine whether the key value included in the URL password, when used to sign the nonce using the cryptographic signature algorithm, results in a cryptographic signature value that includes the required bit string; and
responsive to a success of the verification operation, providing the client computing device access to the specific content of the protected URL.

15. The non-transitory computer-readable medium of claim 14, wherein the operations further comprise:
providing a codebook to the client computing device, wherein the codebook comprises information specifying details of the cryptographic signature algorithm.

16. The non-transitory computer-readable medium of claim 15, wherein the codebook further comprises a plurality of cryptographic signature algorithm specifications, including a specification for the cryptographic signature algorithm, and wherein each of the cryptographic signature algorithm specifications has a corresponding time limit on how long that cryptographic signature algorithm is valid.

17. The non-transitory computer-readable medium of claim 14, wherein the operations further comprise:
responsive to a failure of the verification operation, denying the client computing device access to the specific content of the protected URL.

18. The non-transitory computer-readable medium of claim 14, wherein performing the verification operation further comprises checking that the key value has not been previously used.

19. The non-transitory computer-readable medium of claim 14, wherein the operations further comprise:
recording the key value in a used passwords database, wherein key values in the used passwords database are not eligible to be re-used to access the protected URL.

20. The non-transitory computer-readable medium of claim 14, wherein the cryptographic signature algorithm comprises a 256 bit hash value operation.

* * * * *